May 3, 1960
H. G. HAARLER ET AL
2,935,573
RECORDER HAVING VISUAL INDICATOR FOR
HIGH-FREQUENCY GENERATOR OPERATION
Filed Dec. 29, 1954
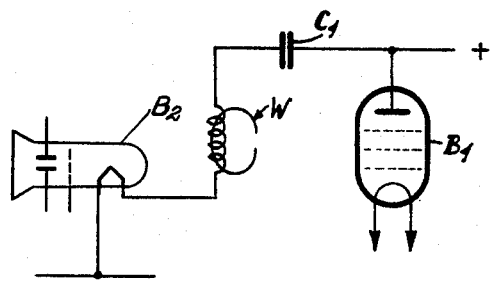
INVENTORS
HENDRIKUS GERHARDUS HAARLER
NICO WITTENBERG
BY
AGENT United States Patent Office 2,935,573
Patented May 3, 1960

2,935,573
RECORDER HAVING VISUAL INDICATOR FOR HIGH-FREQUENCY GENERATOR OPERATION

Hendrikus Gerhardus Haarler and Nico Wittenberg, Eindhoven, Netherlands, assignors, by mesne assignments, to North American Philips Company, Inc., New York, N.Y., a corporation of Delaware Application December 29, 1954, Serial No. 478,378

Claims priority, application Netherlands January 11, 1954

1 Claim. (Cl. 179—100.2)

The invention relates to a device for reproducing and recording magnetic records, comprising a high-frequency generator for erasing and premagnetizing.

It is known to use a thermionic tube for supervisory purposes in such a device. More particularly, a cathode-ray indicator comprising a thermionic tube is often used for optical supervision of the modulation depth of the recorded signal. With the aid of such a supervisory means it is possible to indicate during the recording process to what extent the limit of excitation of the device is approached. Owing to the direct nature of such supervision, distortion of the signal to be recorded due to excessive excitation of the device during the recording process may be avoided.

The invention is characterized in that the heating element of the cathode of the thermionic tube is fed from the circuit of the high-frequency generator.

Such a measure has the advantage that a supervisory means already provided fulfills an additional checking function, i.e. the indication of the operation or non-operation of the high-frequency generator. The fact that such an indication may be of importance will be obvious, since the presence of premagnetization is absolutely required to obtain a record of reasonable quality. If the measure according to the invention is not applied then the non-operation of the high-frequency oscillator, resulting in a recording of poor quality, can be detected only during the playing of the magnetic carrier. In the device according to the invention the luminescence of the cathode-ray indicator will be a guarantee of the operation of the high-frequency generator, so that the disadvantage of an unexpected inferior quality of recording is avoided.

Moreover, during the reproduction of a record the erasing operation must be omitted; otherwise the record obtained will be neutralized prematurely, i.e. before reaching the reproducing head. To this end, if this is not performed automatically, the generator must be stopped during the change-over of the device into the reproducing position. In a device according to the invention the latter performance can be ascertained very rapidly, since the luminescence of the indicator gives proof of the presence of an erasing field.

The invention may be carried out in a very inexpensive and simple manner, since the indicator already provided for supervisory purposes, for example, for modulation measurement, must be fed with incandescent energy and since the source of energy, i.e. the high-frequency generator, is already provided in the device.

In order that the invention may be readily understood, it will now be described more fully with reference to the accompanying drawing.

Referring to the figure, reference $B_1$ designates a high frequency generator tube of a device for reproducing and recording magnetic records for the erasing and premagnetization operations. Provision is furthermore made of, for example, a cathode-ray indicator as an optical supervisory means, designated by $B_2$ in the drawing. According to the invention, the cathode of tube $B_2$ is heated by the energy fed from the circuit of the high frequency generator. The high-frequency energy is supplied to the cathode of $B_2$ subsequent to passage through the blocking capacitor $C_1$ and the coil of the erasing head W.

Although a preferred embodiment of the invention has been disclosed, it is to be understood that many changes and modifications will be readily apparent to those skilled in the art without departing from the spirit and scope of the invention as defined in the appended claim.

What is claimed is:

In a magnetic recording system, the combination comprising a high-frequency generator for producing an erasing and premagnetizing voltage including a thermionic tube having an output electrode, a directly heated cathode-ray indicator having a cathode, and means for coupling the high frequency energy from said generator to said indicator comprising the series connection of a blocking capacitor and an erasing head coupling said output electrode to said directly heated cathode, whereby said indicator provides an optical indication of the operating condition of said generator, said energy comprising the heating energy for said cathode.

References Cited in the file of this patent
UNITED STATES PATENTS

| 1,677,021 | Danley | July 10, 1928 |
| 1,951,036 | Parker | Mar. 13, 1934 |
| 2,149,080 | Wolff | Feb. 28, 1939 |
| 2,542,021 | Fox | Feb. 20, 1951 |
| 2,658,953 | Putzrath | Nov. 10, 1953 |
| 2,703,877 | Stoff et al. | Mar. 8, 1955 |

FOREIGN PATENTS

| 481,549 | Canada | Mar. 4, 1952 |

OTHER REFERENCES

QST Magazine (pp. 12-15), July 1951, vol. XXV, No. 7.